Sept. 6, 1955
J. A. SCHULTE
2,716,853
HARROW DRAWBAR
Filed Jan. 21, 1953
2 Sheets-Sheet 1
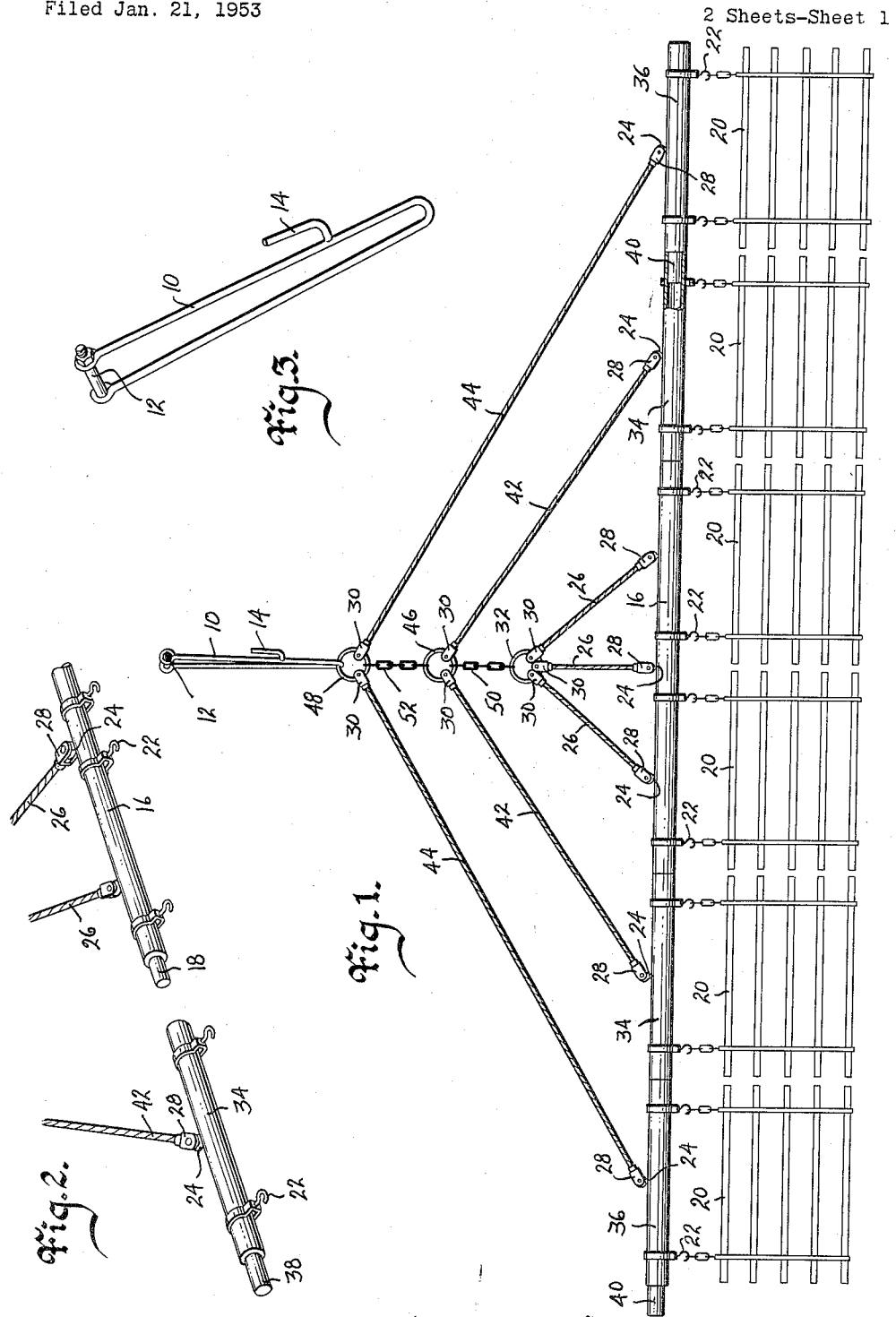
Inventor: John A. Schulte
by Talbert Dick & Adler
Attorneys
Witness
Edward P. Seeley

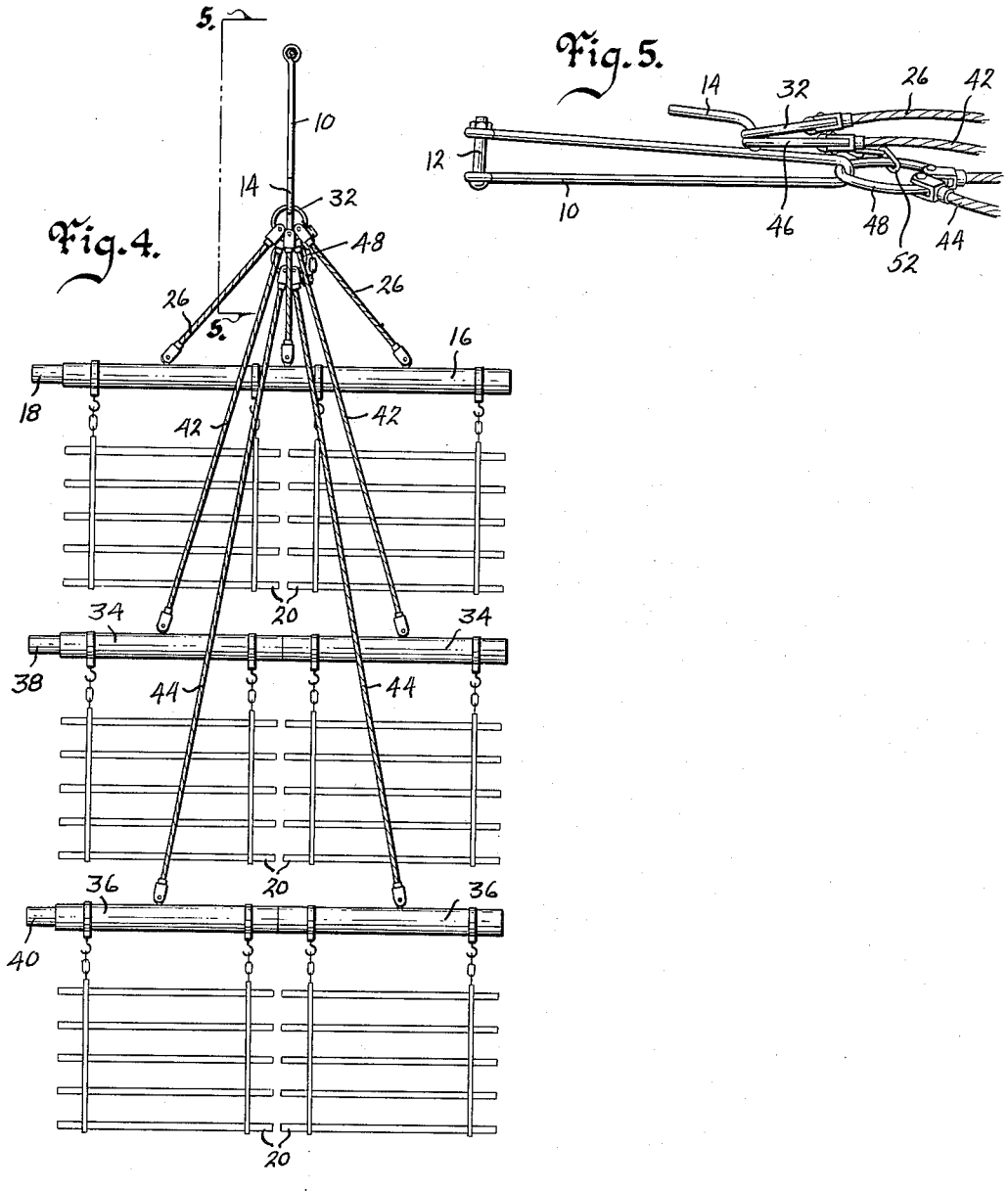

United States Patent Office 2,716,853
Patented Sept. 6, 1955

2,716,853

HARROW DRAWBAR

John A. Schulte, Sac City, Iowa

Application January 21, 1953, Serial No. 332,260

4 Claims. (Cl. 55—84)

My invention relates to harrow drawbars and is an improvement over the disclosure made in my copending application on the same subject matter filed May 16, 1952, and having Serial Number 288,203.

Harrow drawbars, particularly with endwise extension units, must be reduced in width at times for passage through restricted passageways such as gates, and of the different means that have been devised to accomplish this purpose my invention is particularly concerned with drawbars in which the extension units are detachable from the center section and placed in tandemwise relationship thereto. One of the problems arising in such tandem alignment has been the fact that the respective harrow sections tended to overlap longitudinally of their direction of movement and a means to increase the spacing between such tandem aligned harrow sections was disclosed in my copending application above identified. However, when more than one drawbar extension is used on each side of the center section, certain spacing problems still remain relative to the end sections in the tandem especially as well as in the tendency for adjacent harrow sections in the tandem to overlap somewhat laterally.

With these problems in mind it is the general aim of my invention to provide a lengthwise adjustable harrow drawbar having detachable extension units that can be arranged in tandemwise relationship for passage through a restricted area such as a gate in such a manner that there is no overlapping by the harrow sections either laterally or in the direction of forward movement.

More particularly it is an object of my invention to provide a harrow drawbar of the above class in which the center section and each pair of extension units are connected respectively to a separate coupling member with said coupling members connected in tandem to a common linkage means that is attached to a pulling source. Included in this structure is a common attaching means at or adjacent the pulling force which is engageable at times with all the respective coupling members so that a substantially like and adequate spacing is provided between the respective drawbar sections when arranged in tandem.

Another object of this invention is to provide a harrow drawbar of the class described that is formed with attaching means for the center section and respective extension units of such a type that when a corresponding pair of extension units are removed from the center section and placed in tandem thereto, said extension units can be coupled together in the same manner as to the center section, and thereby produce a second drawbar in tandem with the center section. Likewise, this same structure is applicable to drawbars having more than one set of extension units arranged thereon.

These and other objects will be apparent to those skilled in the art.

My invention consists in the construction, arrangement and combination of the various parts of the device, whereby the objects contemplated are attained as hereinafter more fully set forth, and specifically pointed out in my claims, and illustrated in the accompanying drawings, in which:

Fig. 1 is an elevational view of a six harrow section drawbar showing a preferred embodiment of my invention, Fig. 2 is an enlarged perspective view of a stub section and a portion of the center drawbar section to illustrate their means of attachment, Fig. 3 is an enlarged perspective view of the clevis and hook attaching means used with this invention, Fig. 4 is an elevational view of a harrow drawbar with the respective stub extension units arranged in tandemwise relationship and illustrating the use of the clevis and hook attaching means and also the arrangement of the stub sections, and Fig. 5 is an enlarged side elevational view of the clevis and hook thereon to show its association with the several coupling rings for the cables to the drawbar and extensions when arranged in tandem.

Referring to the drawings I have used the numeral 10 to designate an elongated clevis hitch member provided with a removable bolt 12 across its open end. A hook 14 is secured to the clevis 10 as shown in Fig. 3 so that the free end extends towards the clevis bolt 12. This bolt will be attached to a tractor hitch or the like (not shown) and the closed end of the clevis will connect to a coupling ring as will later appear. The center drawbar section 16 consists of an elongated tubular member having a stub shaft 18 on one end and preferably I have shown this center section as adapted to pull two harrow sections 20 for which are provided the hooks 22. However, it will be understood that any predetermined number of sections 20 can be adapted to the center section 16. A plurality of spaced eye members 24 are on the center section or tubing 16 and a flexible member such as the cable 26 is detachably connected at one end to each respective eye by a clevis 28 and similarly connected by a like clevis 30 at the other end to a coupling ring 32.

The center drawbar section 16 just described is endwise adjustable as to length by attaching a stub extension unit to each side, and for this purpose I have illustrated the use of two such sets of extensions. The first is identified by the numeral 34 and the second, which is extended from the first, carries the numeral 36. Each extension 34 and 36 consists of a tubular member shorter than member 16 and each has the stub shaft 38 and 40 respectively extending from one end. In this respect it is pointed out that when the center section 16 is extended as shown in Fig. 1, the stub shafts 18, 38 and 40 all extend from the same end of their respective tubing. Each extension is designed to carry one harrow section and these sections together with the hooks therefore carry like numerals as appear on the center section 16.

Each extension 34 and 36 is provided with an eye 24 at its longitudinal center excluding the stub shaft. To these eyes, the flexible members 42 and 44 for units 34 and 36 are connected thereto at one end in the same manner as described for cables 26. At their other end, cables 42 connect to a coupling ring 46 and cables 44 connect to a like ring 48. Thus far described it will be observed that the separate coupling rings 32, 46 and 48 are used for the respective center section and extension units. The rings are arranged in tandem with a flexible linkage such as chain 50 connecting rings 32 and 46 and a like chain 52 connecting rings 46 and 48. With a six harrow section arrangement as shown being used, ring 48 will be engaged in the closed end of clevis 10 and the tandem alignment of rings 46 and 32 provide for an equalized draft. To use only a four section harrow, it will be apparent that cables 44, ring 48 and sections 36 are removed so that ring 46 can be engaged in clevis 10. Likewise, ring 32 will be placed in the clevis 10 if only a two section harrow is desired, and all extension units will be removed. It will, of course, be understood that in the structure above described cables 44 are of equal length and longer than cables 42, and that cables 42 are of equal length and longer than cables 26. The use of three cables 26 is preferable on the center section although two will also serve satisfactorily and obviously the two outer cables 26 are of equal length.

The extended drawbar as described and illustrated particularly in Fig. 1 must of necessity be reduced in length to negotiate the relatively narrow confines of a gate or the like and for this purpose the respective extension units are arranged in tandem to the center section. To accomplish this, the tractor will be backed sufficiently to provide slack in the several cables so that units 36 can be withdrawn from units 34, and units 34 withdrawn from the section 16. Thus separated, they are arranged in tandem as shown in Fig. 4. Rings 46 and 32 are placed on hook 14 (Fig. 5) and the units 34 and 36 respectively are then coupled together in the same manner as they were coupled to the center section 16. The effect of this arrangement is that all rings 48, 46 and 32 are now attached at relatively the same position on the clevis 10 and the units 34 and 36 each are formed into single separate drawbars in tandemwise alignment. The spaced relationship between the several drawbar sections in tandem will be substantially the same and adequate so that no overlapping of the harrow sections 20 occur. Likewise, my novel arrangement of coupling the units 34 and 36 when in tandem not only eliminates any lateral overlapping that has formerly been present when placing drawbars of this type in tandem, but also provides in effect an operable arrangement of multiple draft bars in tandem alignment.

It is submitted that the invention shown and described is aptly suited to achieve the purposes intended and is characterized by a combination of highly useful and mutually cooperating elements that combine their respective and proportionate functions in accomplishing the objects sought to be obtained.

Some changes may be made in the construction and arrangement of my harrow drawbar without departing from the real spirit and purpose of my invention, and it is my intention to cover by my claims, any modified forms of structure or use of mechanical equivalents which may be reasonably included within their scope.

I claim:

1. In a harrow drawbar, a lengthwise adjustable drawbar formed of a center section and a set of stub sections extending from each end of the center section, coupling means for detachably connecting said stub sections to said center section and supporting the same in endwise alignment, a clevis hitch, a hook formed on said clevis hitch, a first coupling ring engageable with said clevis hitch, a flexible pull member connecting each stub section to said first coupling ring, a second coupling ring, flexible pull members connecting said center section to said second coupling ring, a flexible linkage connecting said rings, said stub section detachable from said center section and arrangeable in tandem relationship thereto, and said second coupling ring engageable with said hook when said tandem alignment is formed.

2. In a harrow drawbar, a lengthwise adjustable drawbar formed of a center section and a set of stub sections extending from each end of the center section, coupling means for detachably connecting said stub sections to said center section and supporting the same in endwise alignment, a clevis hitch, a hook formed on said clevis hitch, a first coupling ring engageable with said clevis hitch, a flexible pull member connecting each stub section to said first coupling ring, a second coupling ring, flexible pull members connecting said center section to said second coupling ring, a flexible linkage connecting said rings, said stub section detachable from said center section and arrangeable in tandem relationship thereto, said second coupling ring engageable with said hook when said tandem alignment is formed, and said stub sections when in tandem as described connectible in endwise alignment by said coupling means to form a second drawbar in tandem with the center section.

3. In a harrow drawbar, a lengthwise adjustable drawbar formed of a tubular center section and a set of tubular stub sections extending from each end of the center section, a stub shaft on the same relative end of said center section and said stub sections to form a coupling means for detachably connecting said stub sections to said center section and supporting the same in endwise alignment, a clevis hitch, a hook formed on said clevis hitch, a first coupling ring engageable with said clevis hitch, a flexible pull member connecting each stub section to said first coupling ring, a second coupling ring, flexible pull members connecting said center section to said second coupling ring, a flexible linkage connecting said rings, said stub section detachable from said center section and arrangeable in tandem relationship thereto, said second coupling ring engageable with said hook when said tandem alignment is formed, and said stub sections when in tandem as described connectible in endwise alignment by said coupling means to form a second drawbar in tandem with the center section.

4. In a harrow drawbar, a lengthwise adjustable drawbar formed of a tubular center section and a set of tubular stub sections extending from each end of the center section, a stub shaft on the same relative end of said center section and said stub sections to form a coupling means for detachably connecting said stub sections to said center section and supporting the same in endwise alignment, a second coupling means consisting of at least two ring members connected in line by a flexible linkage so as to be parallel to the direction of normal movement of the drawbar, said forward ring designed to be connected to a pulling source, a flexible pull member connecting each stub section to the forward ring in said second coupling means, flexible pull members connecting said center section to the rearward ring in said second coupling means, said stub sections detachable from said center section and arrangeable in tandemwise relationship thereto, said stub sections when in tandem as described connectible in endwise alignment by said first coupling means to form a second drawbar in tandem with the center section, and means for connecting all of said rings at substantially the same forward point when said stub sections are in tandem.

References Cited in the file of this patent

UNITED STATES PATENTS

| | | |
|---|---|---|
| 952,210 | McGovern | Mar. 15, 1910 |
| 1,173,342 | Darnell | Feb. 29, 1916 |
| 1,230,294 | Hansen | June 19, 1917 |
| 1,722,540 | Rasmussen | July 30, 1929 |
| 1,729,883 | Lessman | Oct. 1, 1929 |
| 2,096,864 | Strunk | Oct. 26, 1937 |
| 2,131,667 | Noble | Sept. 27, 1938 |